United States Patent

Jonsson

[15] 3,659,632
[45] May 2, 1972

[54] FAUCET CONTROL HAVING AN AUXILIARY OUTLET

[72] Inventor: Bengt Harald Jonsson, Schlosslihalde 33, CH-6000 Luzern, Switzerland

[22] Filed: Mar. 20, 1970

[21] Appl. No.: 21,299

[30] Foreign Application Priority Data

Mar. 20, 1970 Sweden..................................3880/69

[52] U.S. Cl..............................137/610, 137/613, 251/215
[51] Int. Cl......................F16k 1/04, F16k 5/06, F16k 11/10
[58] Field of Search............137/608, 610, 613, 801, 625.17; 251/215, 222, 224, 264

[56] References Cited
UNITED STATES PATENTS 3,202,181   8/1965   West...............................137/625.17
2,000,791   5/1935   Schmiedeknecht................137/608 X
3,108,748   10/1963   Fiore............................137/625.17 X

FOREIGN PATENTS OR APPLICATIONS 80,540   3/1934   Sweden

Primary Examiner—William R. Cline
Attorney—Linton & Linton

[57] ABSTRACT

A faucet control mountable on a faucet duct housing, capable of controlling the flow through said duct and also providing an auxiliary outlet from said control even when said faucet duct is closed by said control.

2 Claims, 1 Drawing Figure

Patented May 2, 1972
3,659,632
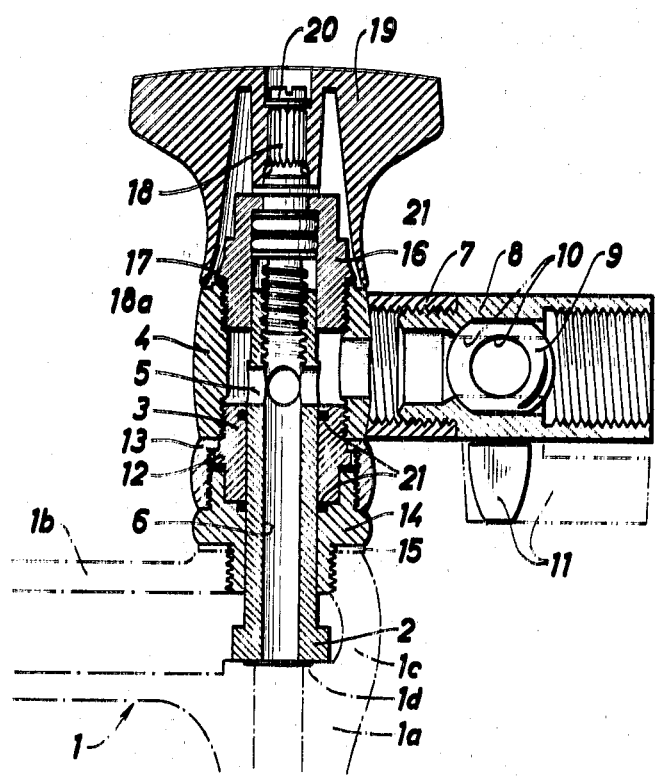
INVENTOR
BENGT HARALD JONSSON
ATTORNEYS

FAUCET CONTROL HAVING AN AUXILIARY OUTLET

The present invention relates to a top portion of a faucet or similar.

The principal object of the invention is to provide a top portion of a water faucet, which is of attractive design and occupies little space, and which is easily mounted in substitution of a conventional faucet top by way of example in a kitchen or a bathroom. By means of the said faucet top water can be taken out from an auxiliary outlet for example to a dishwashing machine or a washing machine irrespective of the main valve controlling the flow through the already existing outlet of the faucet being open or closed. This object has been obtained by designing the top portion of the faucet in such a way that it is characterized by having a sleeve shaped, axially displaceable valve body, one end of which is arranged to be pressed tightly against a valve seat in order to block the communication between a supply duct and a first branch duct beginning in a faucet housing, surrounding the annular end portion of the valve body, which can be pressed to a tight fit against the valve seat, while the communication between said supply duct and a second branch duct also in said closed position of the valve body being open via a channel in the hollow valve body and openings arranged in the walls of that end portion which is located outside said valve housing.

An example of an embodiment of a top portion of a faucet according to the invention will now be described with reference to the accompanying drawing, in which a cross sectional view of a top portion of a faucet according to the invention is illustrated.

The common lower portion of the faucet is entirely indicated with the FIG. 1, said lower portion comprising a supply duct 1a and a discharge duct 1b leading to a discharge spout or similar, which ducts are connected by means of a faucet housing 1c, in which a valve seat 1d is arranged, against which valve seat one end of a valve body can be pressed in order to block the communication between the supply duct 1a and the discharge duct 1b. Such a valve body belongs to the upper part of the faucet, which is supposed to be a part of the installation, which upper part is to be substituted by the faucet top according to the invention. Generally one and the same faucet housing is provided with two faucet tops for the control of one supply duct of hot water and another one of cold water, both being connected to a common discharge spout. In case of two faucet tops being available one or both can be substituted by faucet tops according to the invention depending upon the desire to have additional outlets for cold and/or hot water.

The faucet top according to the invention comprises a valve body 2, which at the exchange of faucet top will substitute the original valve body. As can be seen in the drawing, the valve body 2 is designed as a long sleeve, which is axially displaceable and guided in sealed mounting in a bush 3 screwmounted in the sleeve, which forms a second valve housing 4 surrounding the valve body 2. In the portion of the valve body, which is placed inside the housing 4, openings 5 are made in the walls, whereby the supply duct 1a is in communication with the valve housing 4 via the interior bore 6 of the valve body 2 and the openings 5, also when the valve body 2 is tightly pressed against the valve seat 1d.

The digit 7 indicates a tube outlet protruding from the valve housing 4 and provided with an interior thread, in which a nipple 8 is screwmounted, said nipple being designed as a cut-off valve. The digit 9 indicates a spherical valve body provided with a through bore 10, which valve body by means of a handle 11 can be turned between a closed position and an open position, the bore 10 in the open position forming communication between the portions of the branch 7,8 situated on both sides of the valve body 9. The valve illustrated can also be substituted by other types of valves or by a self closing coupling.

The sleeve 3, one end portion of which is screwmounted in the valve housing 4, is provided with an annular shoulder 12 surrounded by an edge portion of a nut fitting 13 provided with female thread. In the fitting 13 one end (portion) of another connecting sleeve formed fitting 14 is screwmounted, the other end of said connecting fitting 14 being screwmounted in the faucet housing 1c, said fitting as well as the bush 3 being arranged to guide the valve body 2. By this arrangement it is made possible that the valve housing 4 and therewith the branch duct 7,8 can be set in any desired turning position relative to the branch duct 1b, when mounting the top portion of the faucet on the faucet housing 1c. A washer 15 is inserted between the connecting fitting 14 and the faucet housing 1c, and two O-rings or similar indicated with 21 prevent water from streaming between the housings 4 and 1c. In the upper end of the valve housing 4 a bush 16 is screwmounted, the washer 17 at the outside sealing said bush from said housing. Inside said bush the valve body 2 is extending upwards with its end portion, which has a non-circular cross-section by means of which it is prevented to be turned. Through the bush 16 passes the operating spindle 18, the outside end portion of which carries the operating knob 19, fastened to the operating spindle by means of a screw 20. The operating spindle 18 has an inner end portion 18a provided with a male thread and an intermediate portion carrying a number of O-rings 21, which prevent leakage between the bush 16 and the operating spindle 18. The threaded portion 18a of the operating spindle engages the corresponding female thread provided inside the upper end portion of the valve body 2. Turning the operating knob 19 and therewith the valve spindle 18, the valve body 2 thus will receive a displacing movement in direction from or towards the valve seat 1d.

By the invention a top portion of a faucet is obtained, which requires little space at the same time as it is esthetically attractive, and by means of which it is made possible optionally to take out the fluid coming from the supply duct 1a either through the main outlet or the lateral outlet separately or through both outlets at the same time.

The invention is not limited to the embodiment described and illustrated in the drawing only, but can be variated as to its details within the scope of the following claims.

I claim:

1. A faucet control mountable on a faucet duct housing having a valve seat in said duct and a threaded opening above said valve seat, comprising a tubular fitting with exterior threads capable of threaded engagement with the housing threaded opening, a tubular valve member slideably mounted through said tubular fitting and having an end capable of seating on said housing valve seat, said tubular valve member having a non-circular end, lateral openings between said ends and internal threads in the bore thereof at said opposite end, a bushing having a non-circular recess with said tubular valve member opposite end slideably extending therein, an operating spindle extending into said bushing and having a threaded end in threaded engagement with said tubular valve member bore threads, an operating knob attached to said spindle and partially surrounding said bushing, a tubular valve housing detachably connected to said bushing, surrounding and spaced from said spindle lateral openings and having a lateral auxiliary outlet, valve means controlling said auxiliary outlet and means rotatably and detachably connecting said tubular valve housing on said tubular fitting.

2. A faucet control as claimed in claim 1 wherein said means rotatably and detachably connecting said tubular valve housing on said tubular fitting consists of a second bushing positioned on an opposite side of said tubular valve member lateral openings to said first mentioned bushing, has said tubular valve member slideably extending therethrough and has an exterior flange and an annular nut is in threaded engagement with said tubular fitting and has an inner flange on said second bushing exterior flange and has said tubular valve housing rotatably mounted thereon.

* * * * *